(12) United States Patent
Teich

(10) Patent No.: US 6,578,907 B2
(45) Date of Patent: Jun. 17, 2003

(54) PRE-ASSEMBLED WALL UNIT FOR A VEHICLE CAB

(75) Inventor: Michael Teich, Mannheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/935,872

(22) Filed: Aug. 23, 2001

(65) Prior Publication Data
US 2002/0027380 A1 Mar. 7, 2002

(30) Foreign Application Priority Data
Sep. 7, 2000 (DE) .......................... 100 44 175

(51) Int. Cl.⁷ .............................................. B60N 27/00
(52) U.S. Cl. ............................ 296/190.08; 296/190.01; 296/194
(58) Field of Search ................................ 296/178, 183, 296/190.01, 190.08, 191, 194, 195, 203.04

(56) References Cited

U.S. PATENT DOCUMENTS

| 4,807,094 A | * | 2/1989 | Mateos et al. ............... 296/194 |
| 5,033,567 A | * | 7/1991 | Washburn et al. .......... 296/193 |
| 5,119,718 A |   | 6/1992 | Wagner et al. ............... 454/158 |
| 5,123,258 A | * | 6/1992 | Brown et al. .................. 165/53 |
| 5,189,839 A | * | 3/1993 | DeLand et al. ................ 49/280 |
| 5,358,304 A | * | 10/1994 | Kanemitsu et al. ......... 296/194 |
| 5,660,408 A | * | 8/1997 | Johnson ........................ 248/75 |
| 5,863,093 A | * | 1/1999 | Novoa et al. .......... 296/190.01 |
| 6,106,045 A | * | 8/2000 | Gac et al. ............. 296/190.09 |
| 6,374,780 B1 | * | 4/2002 | Rutyna et al. ........... 123/41.12 |

FOREIGN PATENT DOCUMENTS

| DE | 42 15 743 A1 | 11/1993 |
| DE | 195 44 236 A1 | 6/1996 |
| DE | 297 06 751 U1 | 7/1997 |
| DE | 197 38 656 A1 | 3/1999 |

* cited by examiner

Primary Examiner—D. Glenn Dayoan
Assistant Examiner—Lori L Coletta

(57) ABSTRACT

A wall unit forms a part of the outer wall of a vehicle cab. In order to simplify the accommodation of electrical components in the vehicle cab and to reduce the cost of wiring, the wall unit is configured as a pre-assembled module, which includes a support structure on which electrical components, such as vehicle function controllers, fuses and relays, are fastened. The electrical components are at least partially covered by enclosure elements. The electrical components can be electrically connected with corresponding vehicle component groups via connectors.

13 Claims, 3 Drawing Sheets

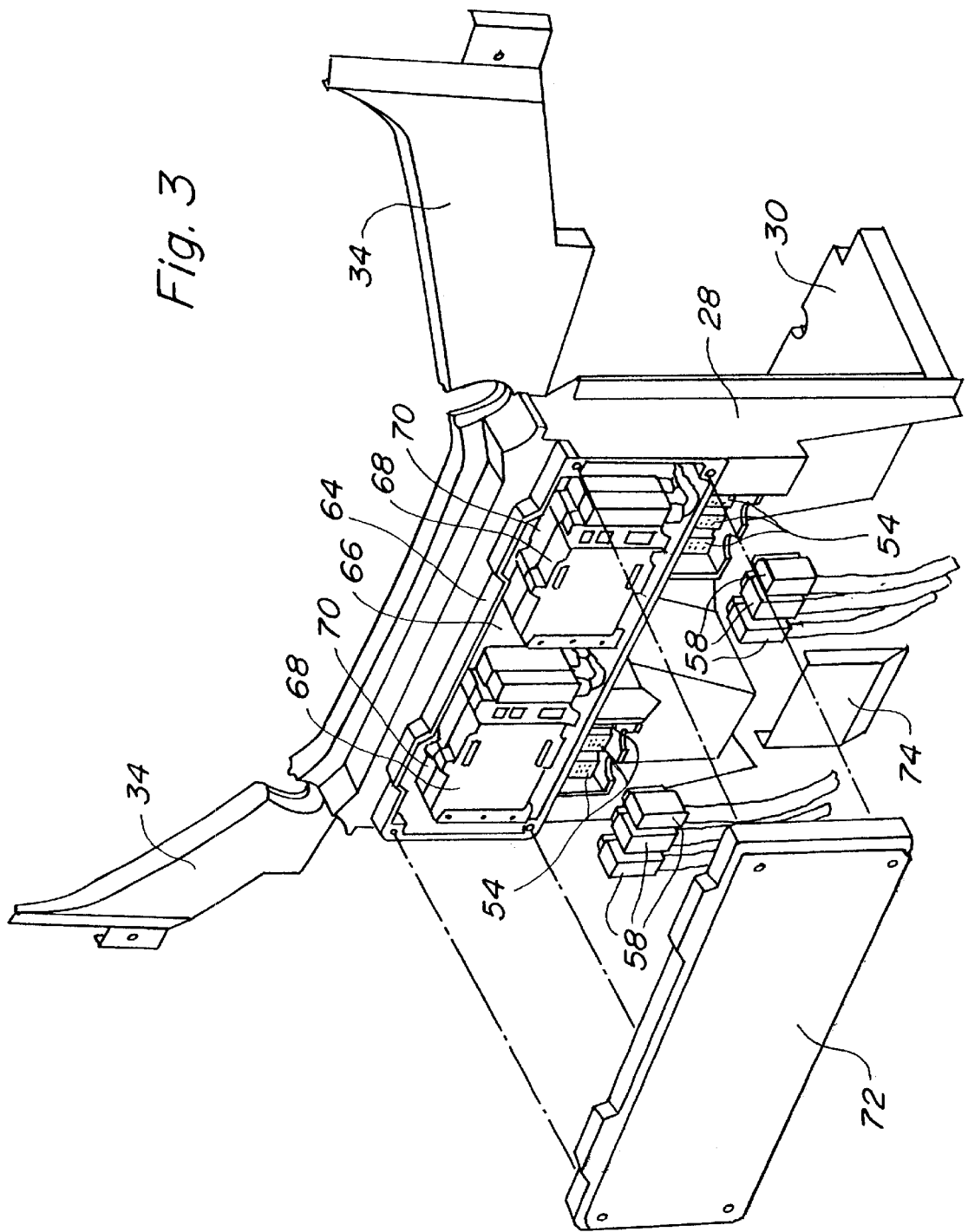

PRE-ASSEMBLED WALL UNIT FOR A VEHICLE CAB

FIELD OF THE INVENTION

The invention relates to a wall unit which forms one part of the exterior wall of a vehicle cab.

BACKGROUND OF THE INVENTION

Vehicle cabs generally contain a cab frame to which, among other items, wall components, doors, flaps and windows are fastened. Cabs for industrial or agricultural vehicles, frequently include a rollover protection frame that is fastened to a rigid floor plate to whose rear side regions fenders are fastened. Such cabs normally pre-assembled completely, in that all necessary wall components, doors and windows are installed between the posts of the cab frame, so that the interior of the cab is enclosed on all sides. Furthermore, the operator's seat, as well as all operating elements and fittings, are installed. During the final assembly of the vehicle the complete pre-assembled cab is mounted on the vehicle body. Following this the necessary mechanical, electrical and hydraulic connections between the vehicle and the cab are established.

Many electrical components that are not actuated constantly by the operator, such as fuses, relays and controllers, that perform various vehicle control tasks are accommodated at various locations within the cab. The positioning of these components is normally difficult, since the interior of the cab should be cramped as little as possible and because many regions of the cab are already occupied by various components. With the increasing automation and numbers of associated electrical control elements, it becomes ever more difficult to find appropriate room for the electrical components. Since the electrical components are scattered about the cab a costly wiring process is required that reduces the ability to scan, makes maintenance operations more difficult and is accompanied by safety risks.

SUMMARY OF THE INVENTION

An object of the present invention is to provide a wall unit which simply accommodates electrical components.

Another object of the present invention is to provide a wall unit which reduces wiring costs.

Another object of the present invention is to provide a wall unit for which electrical components can be easily scanned for maintenance operations.

These and other objects are achieved by the present wall unit, which is a pre-assembled module and forms a part of the outer wall of a vehicle cab. The module includes a support structure to which electrical control components are fastened, which are covered at least in part by wall elements. The electrical components are, for example, controllers for control of the vehicle steering, fuses and relays. Furthermore, the electrical components may be connected and disconnected with corresponding vehicle component groups via corresponding connectors.

The pre-assembled wall unit can therefore close an opening in the cab wall. The electrical components can be fastened to the support structure on the inner or outer side of the cab. The connectors of the wall unit can engage corresponding connectors configured as multiple connectors for the cab wiring harness, engine wiring harness and gearbox wiring harness. An appropriate sealing arrangement on the outer contour of the wall unit is provided to seal the cab against undesirable environmental hazards.

The wall unit can combine in a common space the electrical components, in particular the controllers, that were previously scatted about the vehicle cab. The wall unit can be a pre-assembled module that can be assembled completely, independent of the remaining cab, and that can be tested for proper operation. For the testing, the connectors of the module can be connected with connectors of a test rig. The assembly of the electrical components need therefore not be performed on the cab assembly line, hence the time of the process on that assembly line can be reduced and the testing or a search for errors can be simplified. The combined and easily scanned arrangement of the electrical components and their wiring simplifies maintenance and repair operations. Errors that can be attributed to a poorly scanned arrangement of the components and that carry safety risks, can be avoided.

Preferably, the wall unit is mounted at the rear of the vehicle, for example, is located between the rear wheel fenders. Thus, the rear side of the cab underneath the rear window is initially open and is closed by the installation of the wall unit.

Preferably, support structure for the wall unit is arranged between the two rear wheel fenders of the vehicle and has an outer contour which conforms to the structure of the fenders, so that no further wall components are required.

If filter housings are arranged on the inner side of the fenders, as is described in EP-A-0 438 076, the side edges of the support structure will conform to the contour of these filter housings, in order to create a sealed transition. At its upper edge the support structure engages a window sealing arrangement, which supports the rear window and seals it.

Preferably, wings in the upper region of the support structure project outwardly on both sides. These wings close areas of the cab located between each of the vehicle fenders or filter housings on the one hand and the rear window of the cab on the other hand. Thus, the rear region of the cab can be completely closed by the wall unit and the rear window of the cab.

Preferably, the wall unit is configured in a cassette-like or drawer-like form so that it can be inserted over skids or the like into the opening of the vehicle cab, if necessary by means of an assembly robot. For this purpose, the support structure is provided with an essentially vertical cab side wall and an essentially horizontal cab floor plate. Thereby, alongside a cab side wall, a part of the cab floor is integrated into the support structure.

Preferably, the support structure includes openings for the routing of lines and wiring harnesses in order to simplify their routing. These openings can be closed by the assembly of the connectors or the electrical components, or by appropriate sealing elements.

Bordering walls project vertically from the plane of the support structure and are integrated into the support structure, through which housing-like chambers are formed to accommodate the electrical components. The bordering walls provide stiffening of the support structure. One or more of the chambers formed by the bordering walls located on the outside of the support structure can be closed by a cover which forms part of the outer enclosure and protects the electrical components against harmful environmental hazards. The interior side of the support structure is covered by a cab enclosure that protects the interior electrical components on the one hand and on the other hand complies with the interior equipment.

Preferably, the cab enclosure is configured as a cover which projects to the side over the support structure for a cab configuration in which air filter housings are integrated into the cab wall and which are provided with ventilation ducts open to the interior of the cab. With the projecting regions the cab enclosure covers the ventilation ducts and includes air flow slots through which air can be drawn from the interior of the cab for a ventilation circuit.

Preferably, a fuse panel is supported in bearings on the support structure so as to pivot in the form of a service flap, so that it can be pivoted away from the support structure. Vehicle fuses, relays and the like can be arranged on one side or on both sides of the plate-shaped fuse panel. The pivoted fuse panel simplifies the access to the components arranged on the fuse panel and to the components located behind the fuse panel. The fuse panel is preferably located on the inside of the cab structure and is covered by an element of the cab enclosure.

The wall unit provides a place for the vehicle controllers. For their various applications, modern utility vehicles require multiple controllers. These can all be combined on the wall unit. Such controllers may include, for example, an engine controller for the control of the main drive engine, a gearbox controller for the control of the gearbox, a lifting arrangement controller for the control of the attachment arrangement, an implement controller for the control of one or more attached implements and further controllers that are provided for further control functions. The controllers are accommodated in metal housings, which seal the electronics hermetically against environmental hazards and that contain sealed outlet openings for the electrical supply and control lines that are combined into wiring harnesses.

Preferably the controllers are accommodated in chambers in the support structure fitted specifically for them. Each chamber can be closed, for example, individually by a cover. However it is advantageous to close several chambers with a single cover, in order to simplify the assembly operation and to reduce sealing problems. The enclosure with covers is particularly appropriate for the outside of the cab. A save space, two or more controllers may be arranged one above the other in a single chamber.

BRIEF DESCRIPTION OF THE DRAWINGS

FIG. 3 is an exterior view of the wall unit according to the invention.

DESCRIPTION OF THE PREFERRED EMBODIMENT

Figure 1:
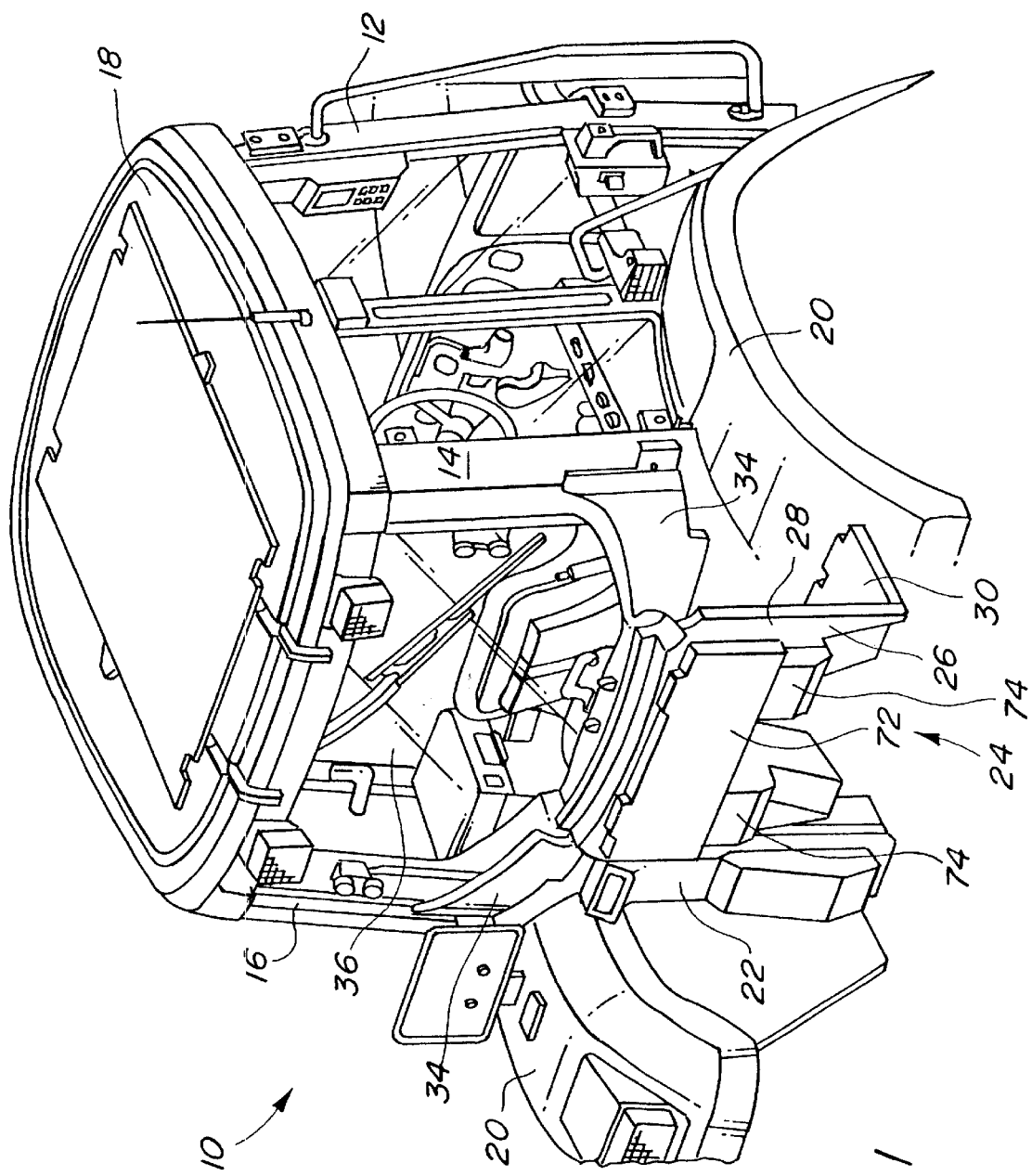
FIG. 1 is a rear perspective view of a tractor cab which includes a pre-assembled wall unit according to the invention.

FIG. 1 shows a complete pre-assembled tractor cab unit 10 which can be mounted on and connected to a vehicle body during the final assembly. The tractor cab 10 includes essentially of a four-post rollover frame to whose four corner posts 12, 14, 16 enclosure components are fastened, that engage, among other items, the doors and cab windows. The tractor cab 10 has a cab roof 18 and a floor plate (not shown). In its rear region a fender 20 is fastened to each side. On the inner side each fender 20 is followed by an air filter housing 22, of which only the left one is shown. These air filter housings 22 are connected with air channels extending vertically in the region of the rear corner posts 14, 16 and are accessible from the outside through rectangular covers as was described in EP-A-0 438 076.

On the rear side of the tractor cab 10 a wall unit 24 is mounted. Wall unit 24 is a pre-assembled module which can be formed independent of the remaining tractor cab 10 and which includes a support structure 26. The support structure 26 is essentially L-shaped and is provided with a cab side wall 28 extending vertically and a cab floor plate 30 extending horizontally formed onto it at the bottom. The support structure 26 has a bulge 32 extending into the interior of the cab that contains a free space for, among other items, a hydraulic pump (not shown) mounted on the vehicle differential housing. On each side of the upper region of the cab side wall 28 a wing 34 projects outward. The outside contour of the support structure 26 conforms to an opening in the rear side of the tractor cab 10 in such a way that the side edges of the cab side wall 28 are in contact with the air filter housings 22, the wings 34 enclose a free space between the air filter housings 22 and the rear window 36, and the cab floor plate 30 is in contact with the remaining floor plate of the tractor cab 10 and is a part of the cab floor. Conventional sealing elements (not shown) are used to seal the wall unit 24 against the remaining tractor cab 10.

Sliding rails (not shown) are provided in the region of the cab floor for engaging skids (not shown) positioned on the cab floor plate 30 of the support structure 26. This permits a simple assembly of the wall unit 24, that can be set upon the sliding rails with their skids and then slid forward into the tractor cab 10 until the opening in the rear of the cab is closed by the support structure 26.

Figure 2:
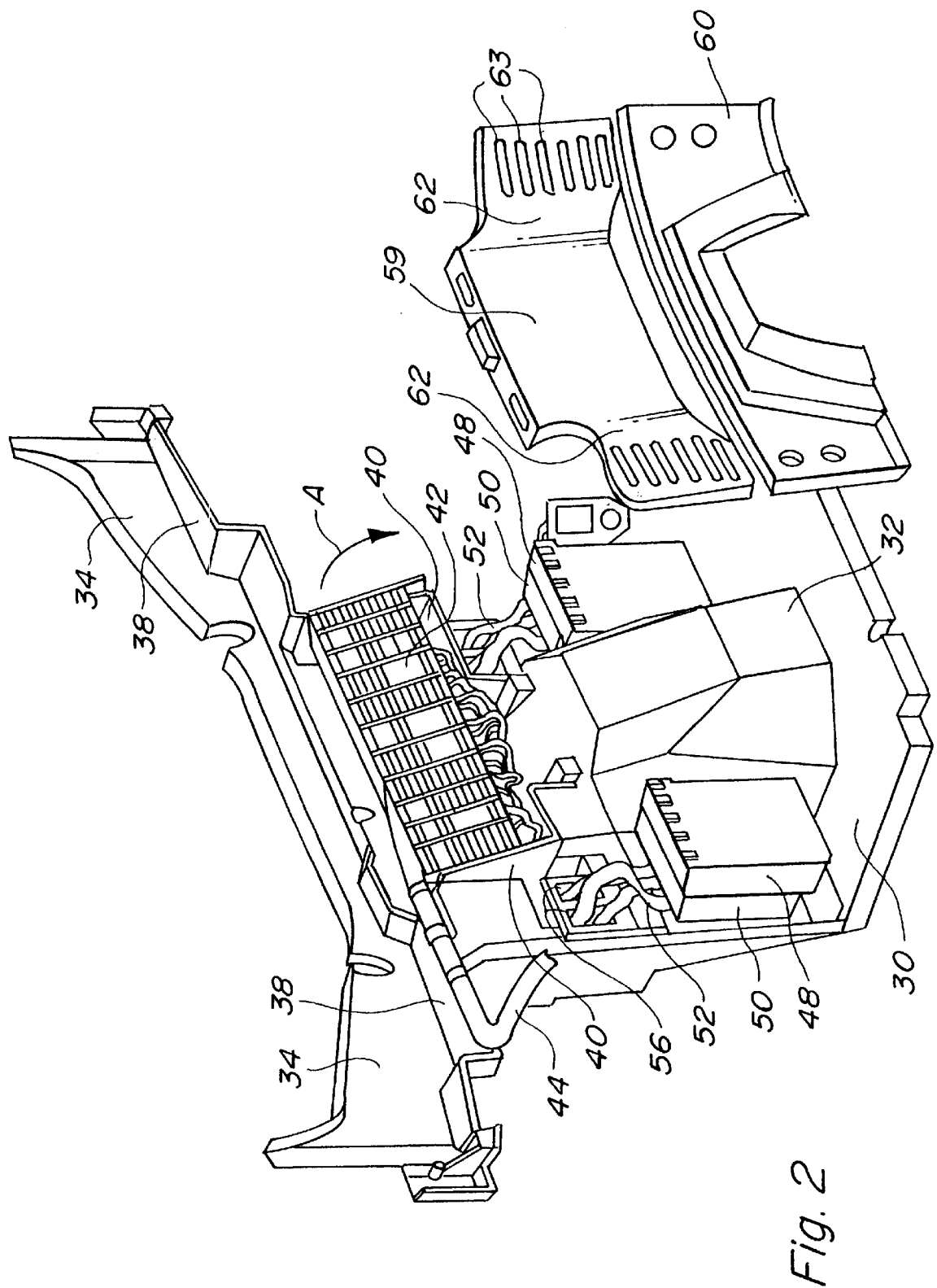
FIG. 2 is an interior view of a wall unit according to the invention.

As best seen in FIG. 2, bordering walls 38, 40 are formed on the inner side of the wall unit 24. The walls 38, 40 project perpendicularly from the cab side wall 28 of the support structure 26 and provide stiffening for the support structure 26, and border a chamber in which a fuse panel 42 is arranged.

A fuse panel 42 is supported in bearings on the bordering walls 40 at the side in its lower region over a horizontally extending hinge axis (not shown in any further detail), and may be pivoted forward as a flap from the position shown, so that its upper edge moves forward in the direction of the arrow A and opens an access to the rear side of the panel and to the space behind the fuse panel 42. On the forward side of the panel and, if necessary, on the rear side as well, fuses, relays and other electrical components are arranged, each of which may be combined into pre-assembled component groups, which are provided with plug-in contacts, in order to be able to plug them into corresponding connectors fastened to the fuse panel 42. These electrical components are connected over one or more wiring harnesses 44 with one or more connectors. The connectors can be connected with corresponding cab wiring harness connectors, engine wiring harness connectors, gearbox wiring harness connectors or other connectors, in order to establish connections to corresponding electrical component groups of the vehicle.

Two controllers 48, 50 are mounted, one above the other, on the inner side of the support structure 26 of the wall unit 24 on both sides alongside the bulge 32. These may be commercially available electronic control units, which typically have generally slab-shaped metal housings and which can perform different control functions of the vehicle. The electric lines 52 of the controllers 48, 50 are connected with connectors 54 that are inserted into openings 56 in the cab side wall 28 of the support structure 26. These connectors 54 can be connected with a corresponding plurality of connectors 58, which establish connections with the corresponding vehicle component groups (not shown).

The inner side of the support structure with the fuse panel 42 and the controllers 48, 50 is covered by an upper enclosure element 59 and a lower enclosure element 60 whose shape and visual appearance conforms to the interior equipment of the cab. The enclosure elements 59, 60 can be assembled and disassembled in a simple manner and permit rapid access to the fuse panel 42 or the controllers 48, 50. The enclosure elements 59, 60 project to the side beyond the cab side wall 28 of the support structure 26 and extends over ventilation outlet channels (not shown) of the air filter housing 22. In its projecting regions 62 the upper enclosure element 59 contains air flow slots 63 which permit an air flow from the interior of the cab into the air filter housing 22. On the rear side of the projecting regions 62, not visible in FIG. 2, circulating air filter elements are fastened over the air flow slots 63, such as, for example, by an applied adhesive.

On the outside of the wall unit 24, as best seen in FIG. 3, bordering walls 64 are also formed onto the cab side wall 28 of the support structure 26 projecting vertically. Walls 64 provide stiffening of the support structure 26 and border upon a chamber 66. Chamber 66 receives two controllers 68, 70 which are arranged one above the other, and which are electrically connected with one of the aforementioned connectors 54. The chamber 66 formed by the bordering walls 64 can be closed by a cover 72, so that the controllers 68, 70 are protected against environmental hazards. Furthermore, the connectors 54 and 58 are protected by covers 74, of which one is shown, which are fastened above the connectors 54 and 58.

Although the invention has been described in terms of only one embodiment, anyone skilled in the art will perceive many varied alternatives, modifications and variations in the light of the above description as well as the drawing, all of which fall under the present invention.

What is claimed is:

1. A wall unit for a vehicle cab, the wall unit comprising:
   a support structure on which electrical components are fastened;
   enclosure elements fastened to the support structure for covering the electrical components; and
   connectors for electrically connecting the electrical components to corresponding vehicle components, the wall unit being pre-assembled and forming a part of an outer wall of the vehicle cab, the support structure being attached to a rear portion of the cab and is located generally between rear wheel fenders of the vehicle.

2. The wall unit of claim 1, further comprising:
   a pair of wings coupled to an upper portion of the support structure, the wings projecting on both sides of the support structure, the wings closing a region between the vehicle fenders and a rear window of the cab.

3. The wall unit of claim 1, wherein:
   the support structure includes a generally vertical cab side wall and a generally horizontal cab floor plate.

4. The wall unit of claim 1, wherein:
   the support structure is provided with openings through which extend wires.

5. The wall unit of claim 1, further comprising:
   an interior enclosure for covering at least one of the electrical components.

6. The wall unit of claim 1, wherein:
   the support structure forms a chamber which receives a plurality of controllers and which can be enclosed by a cover.

7. The wall unit of claim 6, wherein:
   one of said controllers is arranged above an other of said controllers.

8. A wall unit for a vehicle cab, the wall unit comprising:
   a support structure on which electrical components are fastened;
   enclosure elements fastened to the support structure for covering the electrical components; and
   connectors for electrically connecting the electrical components to corresponding vehicle components, the wall unit being pre-assembled and forming a part of an outer wall of the vehicle cab, the support structure being attached to a rear portion of the cab and a pair of filter housings are located on either side of the support structure.

9. The wall unit of claim 8, further comprising:
   a pair of wings coupled to an upper portion of the support structure, the wings projecting on both sides of the support structure, the wings closing a region between the filter housings and a rear window of the cab.

10. The wall unit of claim 8, further comprising:
    an interior enclosure for covering at least one of the electrical components, the interior enclosure including sideways projecting regions which cover the air filter housings, the sideways projecting regions having air flow slots formed therein.

11. A wall unit for a vehicle cab, the wall unit comprising:
    a support structure on which electrical components are fastened;
    enclosure elements fastened to the support structure for covering the electrical components; and
    connectors for electrically connecting the electrical components to corresponding vehicle components, the wall unit being pre-assembled and forming a part of an outer wall of the vehicle cab, the support structure including a generally vertical cab side wall and a generally horizontal cab floor plate.

12. A wall unit for a vehicle cab, the wall unit comprising:
    a support structure on which electrical components are fastened;
    enclosure elements fastened to the support structure for covering the electrical components; and
    connectors for electrically connecting the electrical components to corresponding vehicle components, the wall unit being pre-assembled and forming a part of an outer wall of the vehicle cab, the support structure integrally forming bordering walls, the bordering walls projecting perpendicular to side wall of the support structure, and the bordering walls forming chambers which accommodate the electrical components.

13. The wall unit of claim 12, further comprising:
    a cover for closing one of said chambers.

\* \* \* \* \*